United States Patent [19]
Irikura

[11] Patent Number: 5,515,677
[45] Date of Patent: May 14, 1996

[54] AXLE DRIVING APPARATUS FOR A WORKING CAR

[75] Inventor: Koji Irikura, Amagasaki, Japan

[73] Assignee: Kanzaki Kokyukoki Mfg.Co., Ltd., Amagasaki, Japan

[21] Appl. No.: 332,076

[22] Filed: Nov. 1, 1994

Related U.S. Application Data

[63] Continuation of Ser. No. 950,718, Sep. 25, 1992, Pat. No. 5,367,877.

[30] Foreign Application Priority Data

Sep. 27, 1991 [JP] Japan .................... 3-248967

[51] Int. Cl.[6] ................ F16D 31/02; F16D 39/00
[52] U.S. Cl. ............... 60/435; 60/487; 180/53.1
[58] Field of Search ............... 91/499; 92/12.2, 92/57, 71; 60/487, 488, 489, 490, 435; 180/53.1′53.3, 53.8

[56] References Cited

U.S. PATENT DOCUMENTS

| | | | |
|---|---|---|---|
| 3,319,731 | 5/1967 | Kennel | 180/53.8 |
| 3,550,712 | 12/1970 | Feldmann | 180/53.1 |
| 4,262,768 | 4/1981 | Itatani et al. | 180/53.1 |
| 4,304,141 | 12/1981 | Tone et al. | 74/15.2 |
| 4,335,796 | 6/1982 | Smith | 180/53.1 |
| 4,498,349 | 2/1985 | Nishihara | 74/51.2 |
| 4,658,662 | 4/1987 | Rundle | 74/331 |
| 4,727,759 | 3/1988 | Yamoka et al. | 74/15.2 |
| 4,784,013 | 11/1988 | Yamaoka et al. | 74/606 R |
| 4,870,820 | 10/1989 | Nemoto | 60/487 |
| 4,882,940 | 11/1989 | Yamaoka et al. | 74/15.166 |
| 4,896,506 | 1/1990 | Shivvers et al. | 60/487 |
| 4,914,907 | 4/1990 | Okada | 60/487 |
| 4,922,787 | 5/1990 | Fujisaki et al. | 60/487 X |
| 4,932,209 | 6/1990 | Okada et al. | 60/487 |
| 4,986,073 | 1/1991 | Okada | 60/454 |
| 5,046,994 | 9/1991 | Hasegawa et al. | 180/53.1 X |
| 5,099,936 | 3/1992 | Irikura et al. | 180/53.1 |
| 5,367,877 | 11/1994 | Irikura | 60/435 |

FOREIGN PATENT DOCUMENTS 2622655  5/1989  France ............... 180/53.1

*Primary Examiner*—Hoang Nguyen
*Attorney, Agent, or Firm*—Sterne, Kessler, Goldstein & Fox

[57] ABSTRACT

An axle driving apparatus which houses a hydraulic transmission and axles in an axle casing. A pump shaft projects outwardly from the axle casing for inputting engine power. A power take-off shaft, connected in association with the pump shaft, is juxtaposed with the pump shaft in the axle casing, whereby there is no need to separately provide a power take-off route from the engine to the hydraulic transmission. A power transmission route from the engine to the hydraulic transmission is also used as a power take-off route, thereby enabling the power take-off shaft to be driven. The power take-off shaft is juxtaposed in the vicinity of the axle casing to simplify power transmission from the power take-off shaft to a working machine.

16 Claims, 7 Drawing Sheets

AXLE DRIVING APPARATUS FOR A WORKING CAR

This application is a continuation of application Ser. No. 07/950,718, filed Sep. 25, 1992, now U.S. Pat. No. 5,367,877.

FIELD OF THE INVENTION

The present invention relates to an axle driving apparatus for a working car or vehicle which includes a power take off unit or working machine, such as a mower. More particularly, it relates to an axle driving apparatus which does not drive the working machine directly by an engine, but drives the same through a power take-off shaft.

BACKGROUND OF THE INVENTION

A small-sized axle driving apparatus housing therein a hydraulic transmission is well known, as disclosed in U.S. Pat. Nos. 4,914,907, 4,932,209 and 4,986,073 filed by the present applicant.

However, such an axle driving apparatus is not provided with a power take-off shaft so that a working machine, such as a mower, is driven by an engine.

SUMMARY OF THE INVENTION

The axle driving apparatus of the present invention houses a hydraulic transmission, which includes a pump shaft for inputting engine power, in an axle casing. Axles connected in association with a motor shaft of the hydraulic transmission project outwardly from the axle casing. A power take-off shaft is connected in association with the pump shaft so that there is no need to separately provide a power take-off route from the engine to the power take-off shaft. A power transmission route from the engine to the hydraulic transmission is also used as a power take-off route to enable the power take-off shaft to be driven. Since the power take-off shaft is juxtaposed in the vicinity of the axle casing, the power transmission from the power take-off shaft to the working machine is simplified.

DESCRIPTION OF THE PREFERRED EMBODIMENT

Figure 1:
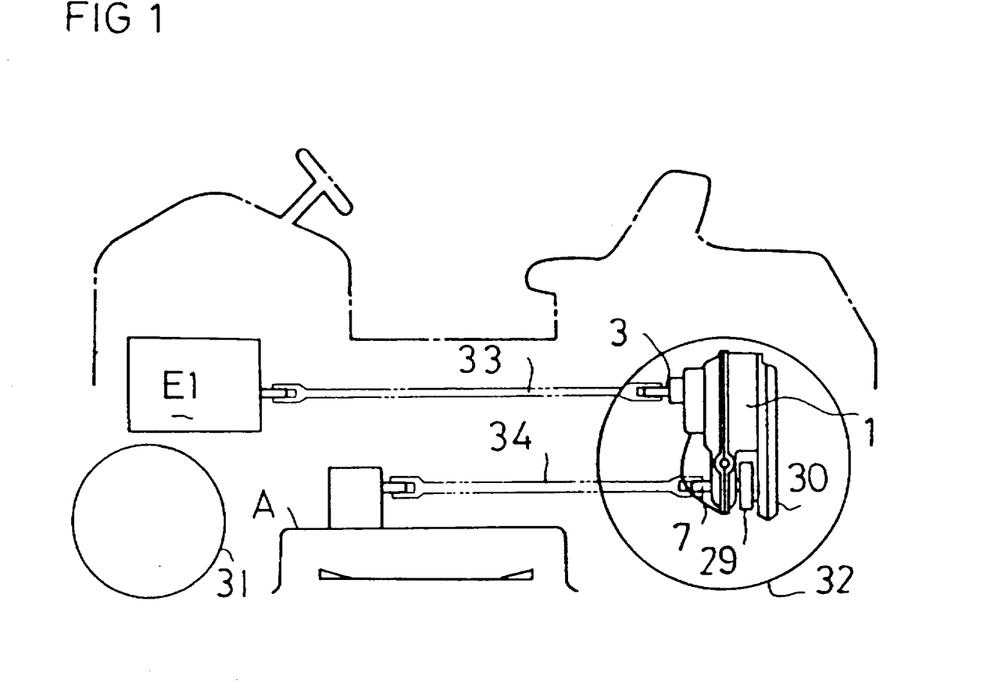
FIG. 1 is a side view of a power transmission system of a working car in which an axle driving apparatus is vertically disposed.

In FIG. 1, a power transmission route of a working car, which includes an engine E1 having a horizontal output shaft, is shown. A working machine A, such as a mower, is suspended between the front wheels 31 and rear wheels 32. Since the working machine A must be vertically movable, it is difficult to directly transmit power thereto from the horizontal output shaft type engine E1. The power is transmitted once, from the horizontal output shaft type engine E1 to the axle driving apparatus through a joint shaft 33. The power is then transmitted from a power take-off shaft 7 provided at the axle driving apparatus through a joint shaft 34 to the working machine A. Such structure puts the power take-off shaft 7 lower than a crank shaft of the horizontal output shaft type engine E1 which facilitates power transmission. Through the use of a universal joint, the working machine A can move vertically through a large stroke range. Clutch means 29 are disposed between the power take-off casing 30 and the power take-off shaft 7.

Figure 2:
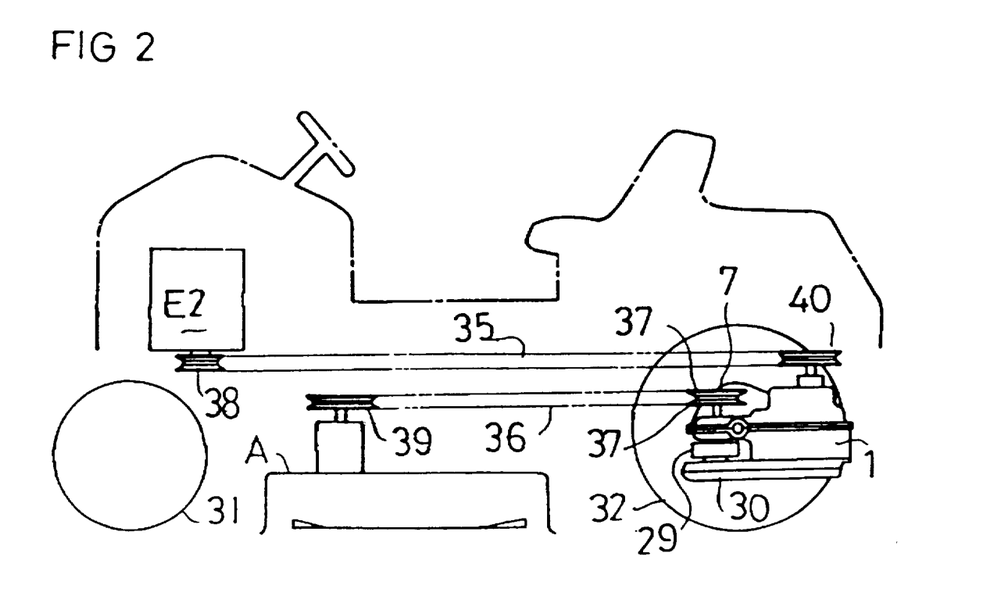
FIG. 2 is a side view of a power transmission system of a working car in which an axle driving apparatus is horizontally disposed.

In FIG. 2, a working ear which includes an engine E2 having a vertical output shaft is shown. Power is transmitted once, from the vertical output shaft type engine E2 to an input pulley 40 at the rear of the axle driving apparatus through a V-belt 35. Power is thereafter transmitted from a power take-off pulley 37 at the power take-off shaft 7 to an input pulley 39 at the working machine A through a V-belt 36. Such structure can interpose a long V-belt 36 between the input pulley 39 and the power take-off pulley 37, whereby, even when the working machine A moves vertically, the V-belt 36 remains in contact with pulley 39.

Figure 3:
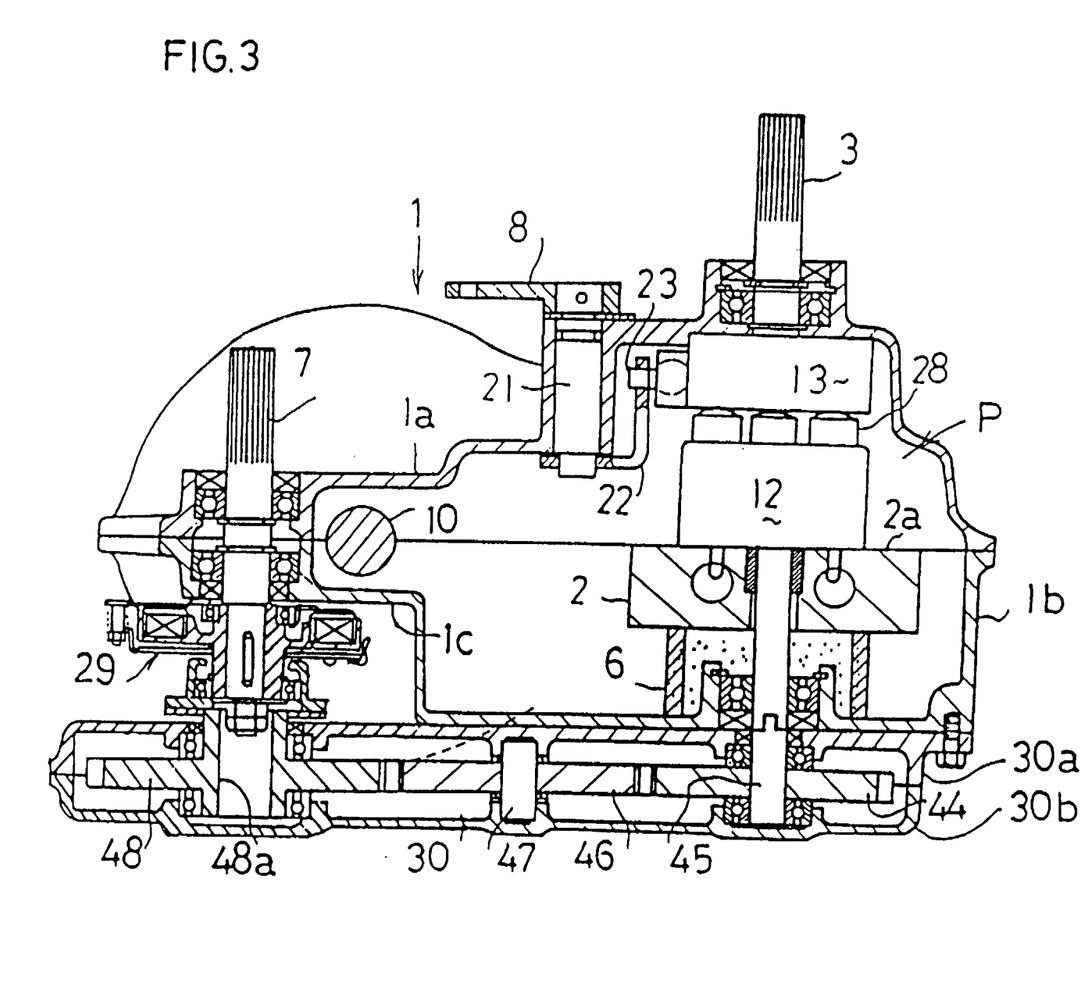
FIG. 3 is a sectional side view of an axle driving apparatus of the present invention taken on the axes of a pump shaft 3 and a power take-off shaft 7.

A sectional side view of an axle driving apparatus of the present invention is shown in FIG. 3, in which an axle casing 1 can be horizontally separated on the axes of axle 10 and motor shaft 4 into a half casing 1a and a half casing 1b. The two half casing 1a and 1b are coupled together, sandwiching between the juncture surfaces, the axle 10 and a bearing for the motor shaft 4. In the present invention, a power take-off casing 30 is attached to the outer surface of the half casing 1b. The power take-off casing 30 also comprises a half casing 30a and a half casing 30b coupled with each other. A recess 1c is formed on the outer surface of the half casing 1b and in the vicinity of the axle 10. Clutch means 29 is disposed between the recess 1c and the power take-off casing 30. In this embodiment, power take-off shaft 7 extends perpendicularly across the junction surface between half casings 1a and 1b and is rotatably supported by axle casing 1. One end of the power take-off shaft 7 projects from the axle casing so that a joint shaft 34 or a power take-off pulley 37 can be attached to the projecting end.

Figure 4:
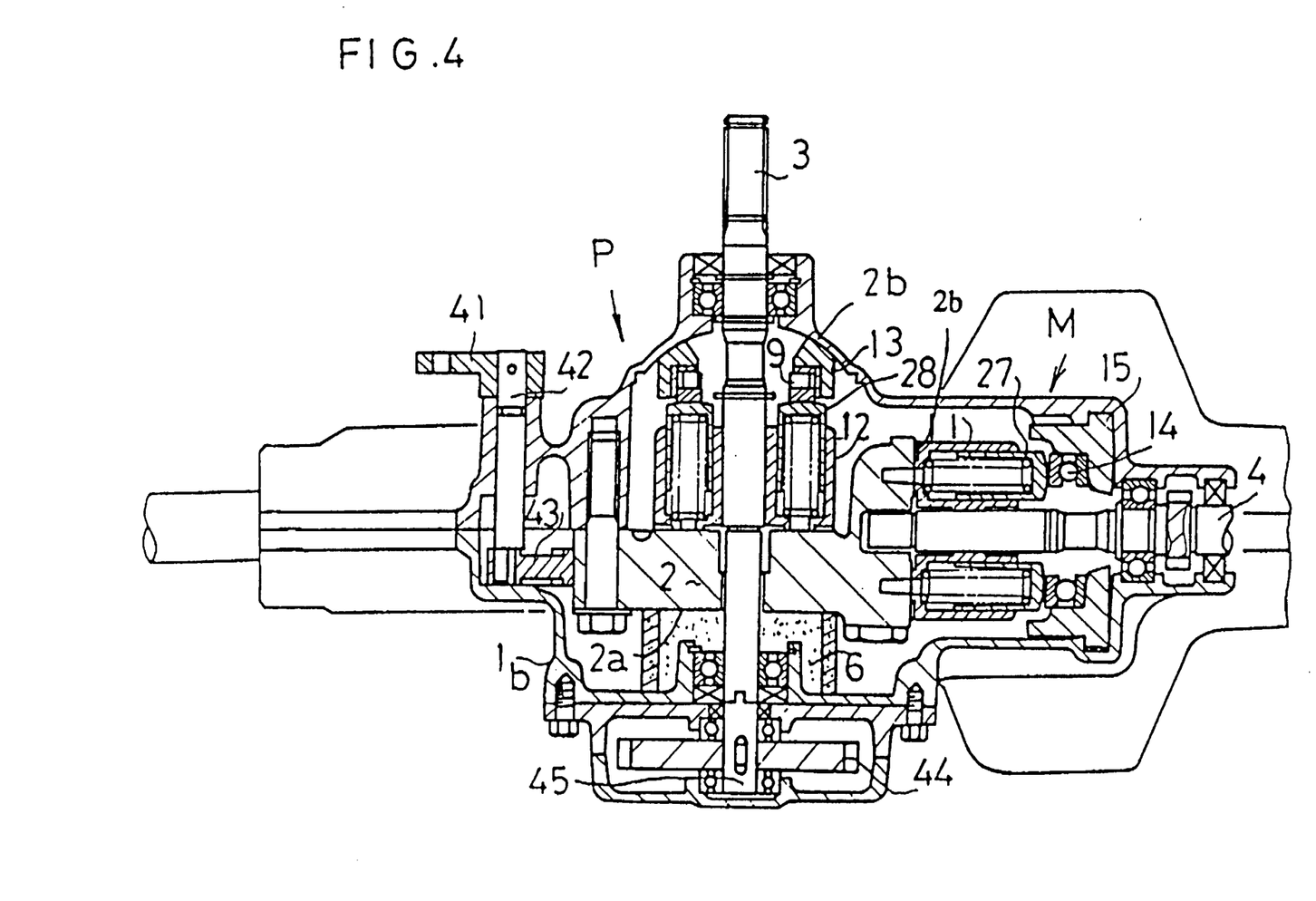
FIG. 4 is a sectional front view of an axle driving apparatus taken on the axis of a pump shaft 3.
Figure 5:
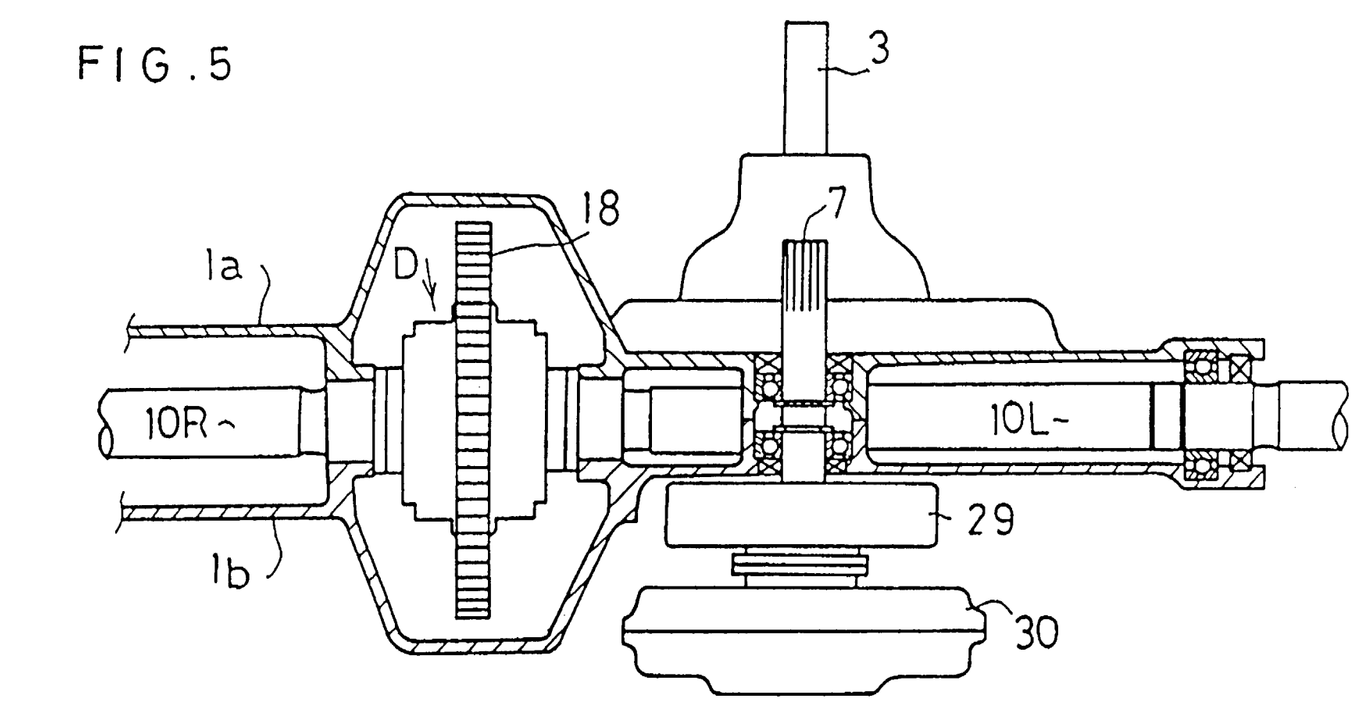
FIG. 5 is a sectional front view of an axle driving apparatus taken on the axis of an axle 10.

As shown in FIG. 4, a hydraulic transmission comprising a hydraulic pump P and a hydraulic motor M is disposed within the axle casing 1 on an L-like shaped center section 2. A hydraulic pump P is disposed on a pump mounting surface 2a formed along the horizontal surface of the center section 2. A hydraulic motor M is disposed on a vertical motor mounting surface 2b of the center section 2. The hydraulic pump comprises a movable swash plate 13, a thrust bearing 9, pump pistons 28 and a cylinder block 12. In order to operate the movable swash plate 13 from the exterior of the axle casing 1, a speed change lever 8, a speed change lever shaft 21, a swash plate rotation arm 22, and a swash plate rotation projection 23 are provided (see FIG. 7). The speed change lever 21 is pivoted to the half casing 1a. An oil filter 6 is disposed between the lower surface of the center section 2 and the inner surface of the bottom of the half casing 1b.

The pump shaft 3 projects through the center section 2 at the end face thereof, passing through the oil filter 6 to reach the outer surface of the half casing 1b. The end face of the pump shaft 3 is juxtaposed or connects with an input shaft 45 at the power take-off casing 30. When the power take-off route is not required, the power take-off casing 30 is removed by separating input shaft 45 from the lower end of pump shaft 3, and the lower end of the pump shaft 3 may be covered with a lid.

Figure 7:
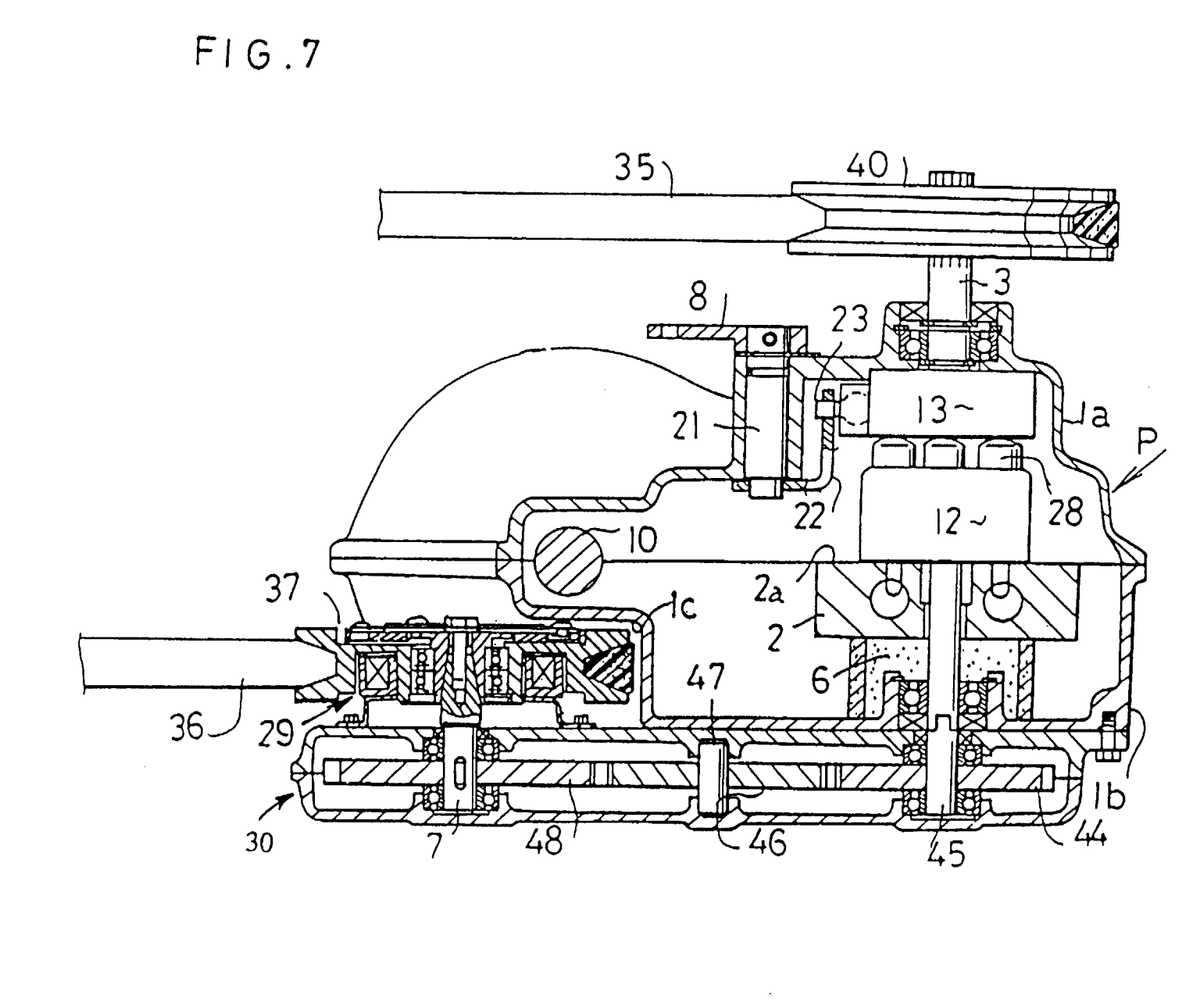
FIG. 7 is a sectional side view of an axle driving apparatus in which a power take-off pulley 37 is disposed between axle casing 1 and a power take-off casing 30.

The power take-off casing 30 is affixed to the outer surface of the half casing 1b. As seen in FIGS. 3 and 7, input shaft 45, gears 44, 46, and 48 are disposed within the power take-off casing 30. These gears comprise the power take-off route whereby power is transmitted from the pump shaft 3 to the power take-off shaft 7. A counter shaft 47 for freely supporting the gear 46, and an output shaft 48a on which the gear 48 is fixed, are also disposed in power take-off casing 30. The rotation of pump shaft 3 is transmitted into the power take-off casing 30 through the input shaft 45 and then to the output shaft 48a through the gears 44, 46, and 48. A flange is provided at one axial end of the output shaft 48a, and a clutch means 29 (for example, an electromagnetic clutch) is connected to the driving side. The power take-off shaft 7 is connected to the driven side.

FIG. 4 is a sectional view of the L-like shaped center section 2. A cylinder block 12 is mounted on the pump mounting surface 2a, and a cylinder block 11 of the hydraulic motor M is rotatably mounted on the vertical motor mounting surface 2b. The hydraulic motor M is provided with a fixed swash plate 15 and a thrust bearing 14. A plurality of motor pistons 27, freely fitted into the cylinder block 11, abut against the thrust bearing 14. A check valve is fitted in the pump mounting surface 2a of the center section 2. Biasing rods 50 (FIG. 6) are provided which open the check valve to short-circuit the high and low pressure closed circuits of the hydraulic transmission, thereby eliminating the output of hydraulic motor M. Also provided are a short-circuit operating arm 41 for operating the biasing rods 50, an operating shaft 42, and a branch operating arm 43.

An output transmitting gear 17 is fixed to the motor shaft 4, and engages with a counter gear 51 at a counter shaft 19. Another smaller diameter gear 52, at the counter shaft 19, engages with a ring gear 18 of a differential gear D. The differential gear D differentially connects a pair of axles 10L and 10R onto which the rear wheels 32 are mounted. A brake unit, comprised of a brake drum 16, is affixed to a portion of the motor shaft which projects outwardly from the axle casing 1.

Figure 6:
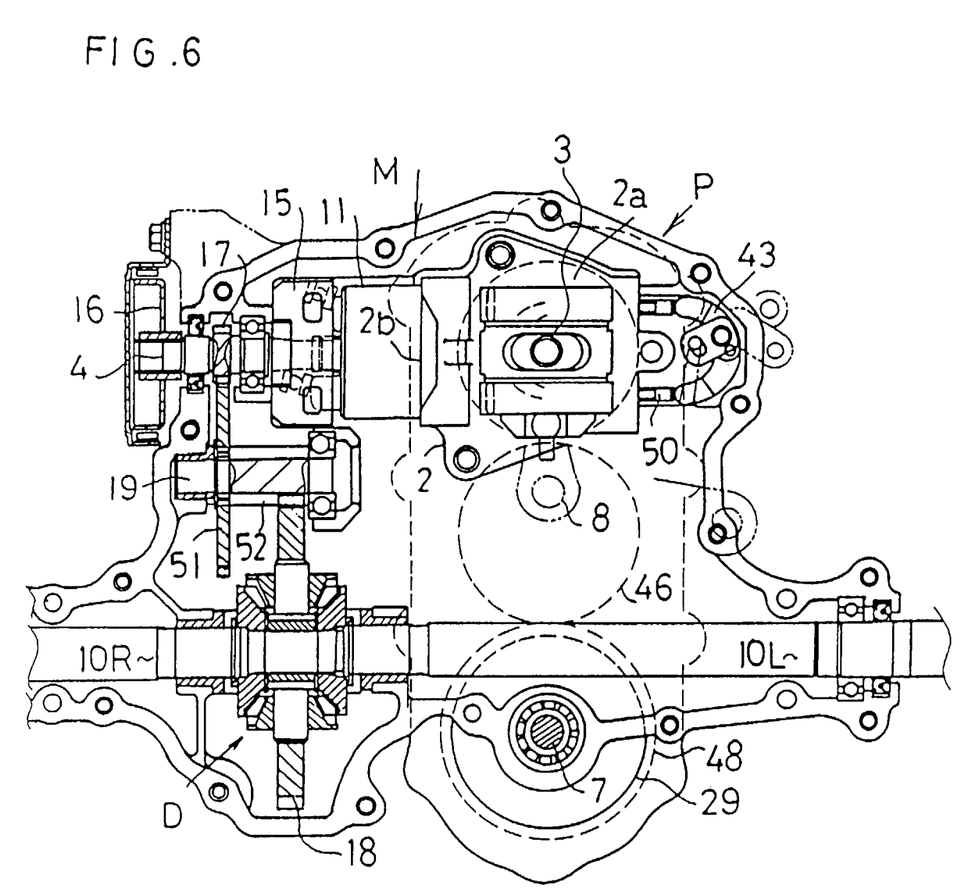
FIG. 6 is a plan view of an axle driving apparatus taken on the axes of axle 10 and a motor shaft 4 from which a half casing 1a is removed.

As best seen in FIG. 6, the axle driving apparatus of the present invention uses an L-like shaped center section 2 in which the rotary axes of pump shaft 3 and motor shaft 4 perpendicularly intersect with each other. The motor shaft 4 is connected in association with the differential gear D through the running power transmission route, gears 17, 18, 51 and 52, whereby a gap, extending in the power transmitting direction, is created between the pump shaft 3 and the axle 10L. The gap is utilized so that the power take-off shaft 7, parallel to the pump shaft 3, is provided in the vicinity of the axle 10L, and both the shafts 7 and 3 are connected in association with each other through the power take-off transmission route.

Explanation will now be given on a modified embodiment showing a different arrangement of power take-off pulley 37, as shown in FIG. 7. In this embodiment, the power take-off shaft 7 does not project to the upper surface of the axle casing 1, but a power take-off pulley 37 is freely fitted on the shaft end of the shaft 7. The power take-off pulley 37 is disposed in the recess 1c formed at the outer surface of axle casing 1. Within the power take-off pulley 37 is formed clutch means 29 for freely coupling the power take-off shaft 7 with the power take-off pulley 37. The remainder of the construction is the same as the previously discussed embodiment.

The power take-off shaft 7 in the above-mentioned embodiment is used as a middle power take-off shaft. It may be desirable to provide a rear power take-off shaft in addition to a middle power take-off shaft, as in the embodiment shown in FIG. 8. Accordingly, the axle driving apparatus as shown in FIG. 8 is for vertical arrangement only.

Figure 8:
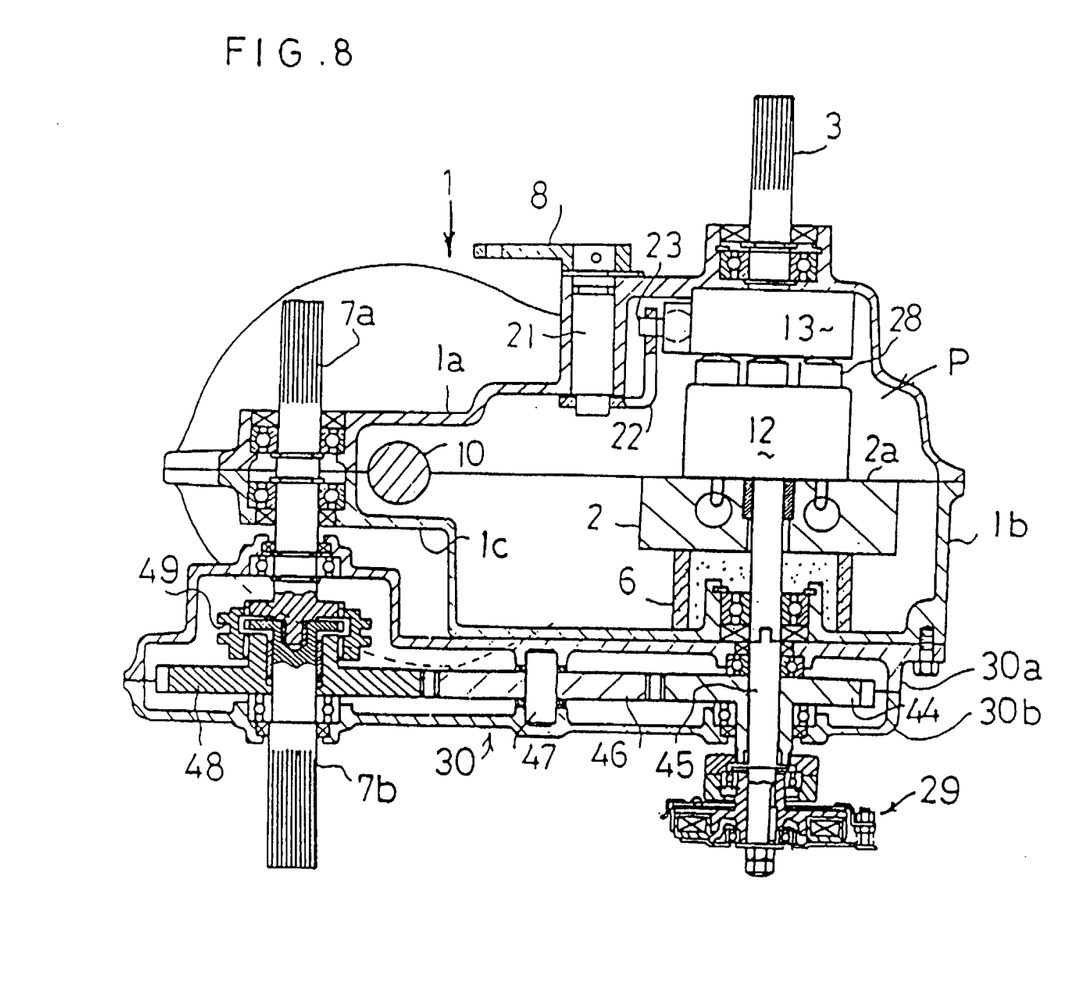
FIG. 8 is a sectional side view of an axle driving apparatus taken on the axes of a pump shaft 3 and power take-off shafts 7a and 7b.

In FIG. 8, the power take-off casing 30 attached to the outer surface of the half casing 1b is provided with a middle power take-off shaft 7a and a rear power take-off shaft 7b. In the power take-off casing 30, the input shaft 45 projects outwardly from the rear end of the power take-off casing 30, and connects to the driving side of clutch means 29. The end of gear 44, freely fitted onto the input shaft 45, similarly projects outwardly from the power take-off casing 30, and a mounting flange is provided to connect to the driven side of the clutch means 29. The middle power take-off shaft 7a is supported by the axle casing 1. Rear power take-off shaft 7b is supported to the power take-off casing 30, in the same construction with respect to the gear 48 as mentioned above. Shaft 7a and shaft 7b are coaxially disposed and freely fitting to each other.

A selection clutch means 49 is disposed on shafts 7a and 7b for selecting whether the gear 48 engages with the middle power take-off shaft 7a, the rear power take-off shaft 7b, or both the power take-off shafts 7a and 7b together. The selection clutch means 49 is disposed within the power take-off casing 30 at a side of recess 1c of the half casing 1b. The selection clutch means 49 may be comprised of a hydraulic multi-plate type clutch or a mechanical clutch. The power transmission route to the power take-off shaft 7 comprises a gear train of gears 44, 46, and 48 in this embodiment, and may instead be formed of chain sprockets.

As seen from the above, the present invention can transmit power once from the engine to the axle driving apparatus through the joint shaft or V-belt, and drive the working machine A by the power take-off shaft 7 provided at the axle driving apparatus. Thus, the starting point of the power take-off route to the working machine A can be positioned at the axle driving apparatus, whereby the stroke for vertical movement of the working machine A can be made larger. The axle driving apparatus, when attached to the working car, can be disposed vertically as shown in FIG. 1, or horizontally as shown in FIG. 2.

When the power take-off casing 30, housing the power take-off route to the power take-off shaft 7, is juxtaposed with the axle casing 1, housing the running power transmission route, the axle casing can be restricted in width. Therefore, when the axle driving apparatus of the present invention is disposed vertically with respect to the body of the working car, the axle casing does not project rearwardly from the body. When the axle driving apparatus is disposed horizontally with respect to the body, the axle casing does not project at the lower surface thereof toward the ground, thereby enabling greater ground clearance.

What is claimed is:

1. An axle driving apparatus for a vehicle, comprising:

an axle casing;

an axle disposed within said casing;

a hydraulic transmission for driving said axle disposed within said axle casing comprising a hydraulic pump hydraulically connected to a hydraulic motor, said hydraulic pump having a pump shaft and said hydraulic motor having a motor shaft, wherein said pump shaft is disposed substantially perpendicular to said motor shaft;

a power take-off casing attached to said axle casing;

a power transmitting means disposed within said power take-off casing, said power transmitting means having an input shaft and an output shaft having a driving side;

a power take-off means connected to said pump shaft through said power transmitting means, wherein said power take-off means is disposed substantially perpendicular to said motor shaft, said input shaft of said power transmitting means is connected to said pump shaft and said output shaft of said power transmitting means is connected to said power take-off means; and a clutch means disposed between said power take-off casing and said axle casing, said clutch means being connected to said driving side of said output shaft of said power transmitting means and said power take-off means.

2. An axle driving apparatus according to claim 1, wherein said power take-off means comprises first and second power take-off shafts, said first power take-off shaft being disposed coaxially with said second power take-off shaft.

3. An axle driving apparatus according to claim 2, further comprising:

a second clutch means for selectively coupling said first and second power take-off shafts to said power transmitting means.

4. An axle driving apparatus according to claim 1, further comprising:

a second power transmitting means for operatively connecting said motor shaft and said axle, wherein said hydraulic pump and said hydraulic motor are arranged adjacent to said axle, and said second power transmitting means is arranged adjacent to said first power transmitting means.

5. An axle driving apparatus for a vehicle, comprising:

an axle casing;

an axle disposed within said casing;

a hydraulic transmission for driving said axle disposed within said axle casing comprising a hydraulic pump hydraulically connected to a hydraulic motor, said hydraulic pump having a pump shaft and said hydraulic motor having a motor shaft, wherein said pump shaft is disposed substantially perpendicular to said motor shaft;

a power take-off casing having a first end and a second end opposed to said first end, said first end of said power take-off casing being attached to said axle casing;

a power transmitting means disposed within said power take-off casing, said power transmitting means having an input shaft having an end projecting outwardly from said second end of said power take-off casing and an output shaft;

a power take-off means connected to said pump shaft through said power transmitting means, wherein said power take-off means is disposed substantially perpendicular to said motor shaft, wherein said input shaft of said power transmitting means is connected to said pump shaft and said output shaft of said power transmitting means is connected to said power take-off means; and a clutch means having a driving side connected to said end of said input shaft projecting from said power take-off casing.

6. An axle driving apparatus according to claim 5, further comprising:

a recess formed between said axle casing and said power take-off casing; and a second clutch means for coupling said power take-off means to said output shaft disposed in said recess.

7. An axle driving apparatus according to claim 5, wherein said power take-off means comprises first and second power take-off shafts, said first power take-off shaft being disposed coaxially with said second power take-off shaft.

8. An axle driving apparatus according to claim 7, further comprising:

a second clutch means for selectively coupling said first and second power take-off shafts to said power transmitting means disposed within said power take-off casing.

9. An axle driving apparatus according to claim 5, further comprising:

a second power transmitting means for operatively connecting said motor shaft and said axle, wherein said hydraulic pump and said hydraulic motor are arranged adjacent to said axle, and said second power transmitting means is arranged adjacent to said first power transmitting means.

10. An axle driving apparatus for a vehicle, comprising:

an axle casing;

an axle disposed within said casing;

a hydraulic transmission for driving said axle disposed within said axle casing comprising a hydraulic pump hydraulically connected to a hydraulic motor, said hydraulic pump having a pump shaft and said hydraulic motor having a motor shaft, wherein said pump shaft is disposed substantially perpendicular to said motor shaft:

a power take-off casing attached to said axle casing;

a power transmitting means disposed within said power take-off casing, said power transmitting means having an input means separably connected to said pump shaft and an output means, wherein power from said pump shaft is transmitted into said power transmitting means through said input means; and a power take-off means connected to said pump shaft through said power transmitting means, wherein said power take-off means is disposed substantially perpendicular to said motor shaft, said input means of said power transmitting means is connected to said pump shaft and said output means of said power transmitting means is connected to said power take-off means.

11. An axle driving apparatus according to claim 10, wherein said power take-off means comprises a power take-off shaft rotatably supported by said axle casing and having one end projecting out of one side of said axle casing, said power take-off casing being attached to another side of said axle casing, wherein said one side of said axle casing is opposite to said another side.

12. An axle driving apparatus according to claim 10, further comprising:

a recess formed between said axle casing and said power take-off casing; and a clutch means for coupling said power take-off means to said output means disposed in said recess.

13. An axle driving apparatus according to claim 10, wherein said power take-off means comprises first and second power take-off shafts, said first power take-off shaft being disposed coaxially with said second power take-off shaft.

14. An axle driving apparatus according to claim 15, further comprising:

a clutch means for coupling said pump shaft to said power transmitting means whereby power is transmitted from said pump shaft to said first and second power take-off shafts.

15. An axle driving apparatus according to claim 14, further comprising:

a second clutch means for selectively coupling said first and second power take-off shafts to said power transmitting means.

16. An axle driving apparatus according to claim 10, further comprising:

a second power transmitting means for operatively connecting said motor shaft and said axle, wherein said hydraulic pump and said hydraulic motor are arranged adjacent to said axle, and said second power transmitting means is arranged adjacent to said first power transmitting means.

* * * * *

UNITED STATES PATENT AND TRADEMARK OFFICE
CERTIFICATE OF CORRECTION

PATENT NO. : 5,515,677
DATED : May 14, 1996
INVENTOR(S) : K. Irikura

It is certified that error appears in the above-indentified patent and that said Letters Patent is hereby corrected as shown below:

Column 7, claim 14, line 1, change "15" to --13--.

Signed and Sealed this

Thirteenth Day of August, 1996

Attest:

BRUCE LEHMAN

Attesting Officer          Commissioner of Patents and Trademarks